United States Patent [19]

Isobe et al.

[11] Patent Number: 5,154,549
[45] Date of Patent: Oct. 13, 1992

[54] THROW-AWAY TIPPED DRILL BIT

[75] Inventors: Kazutaka Isobe; Kazuo Noguchi; Toshio Nomura, all of Hyogo, Japan

[73] Assignee: Sumitomo Electric Industries, Ltd., Osaka, Japan

[21] Appl. No.: 860,103

[22] Filed: Mar. 30, 1992

Related U.S. Application Data

[63] Continuation of Ser. No. 649,615, Feb. 1, 1991, abandoned.

[30] Foreign Application Priority Data

Feb. 5, 1990 [JP] Japan ................................. 2-26754

[51] Int. Cl.⁵ ........................ B23B 27/16; B23B 51/00
[52] U.S. Cl. ..................................... 408/144; 407/50; 407/110; 407/119; 408/231; 408/713
[58] Field of Search .................... 407/50, 110, 119; 408/144, 145, 231-233, 713

[56] References Cited

U.S. PATENT DOCUMENTS

| | | | |
|---|---|---|---|
| 3,540,323 | 11/1970 | Rishel . | |
| 4,493,596 | 1/1985 | Grunsky et al. | 408/231 X |
| 4,527,931 | 7/1985 | Sarin | 407/113 |
| 4,789,277 | 12/1988 | Rhodes et al. | 408/1 R X |
| 4,801,224 | 1/1989 | Pettersson et al. | 407/110 |

FOREIGN PATENT DOCUMENTS

| | | |
|---|---|---|
| 0081775 | 6/1983 | European Pat. Off. . |
| 0118806 | 9/1984 | European Pat. Off. . |
| 0194811 | 9/1986 | European Pat. Off. . |
| 15034 | 12/1990 | European Pat. Off. . |
| 58-143115 | 9/1983 | Japan . |
| 62-218010 | 9/1987 | Japan . |
| 62-46489 | 12/1987 | Japan . |
| 62-292307 | 12/1987 | Japan . |
| 63-38501 | 2/1988 | Japan . |
| 63-38502 | 2/1988 | Japan . |
| 65903 | 3/1990 | Japan ................................. 408/144 |

OTHER PUBLICATIONS

Japanese Industrial Standard "Chromium Molybdenum Steels"; No.: JIS G 4105-1979.
Japanese Industrial Standard "Carbon Tool Steels" No.: JIS G 4401-1983.
Japanese Industrial Standard "High Speed Tool Steels" No.: JIS G 4403-1983.
Japanese Industrial Standard "Alloy Tool Steels" No.: JIS G 4404-1983.

*Primary Examiner*—Steven C. Bishop
*Attorney, Agent, or Firm*—W. G. Fasse; D. H. Kane, Jr.

[57] ABSTRACT

A drill bit has a throw-away drill bit tip in the form of an insert (21, 31) secured to a shank (22, 32) to be mounted in a drilling tool. The insert (21, 31) is disengageably mechanically connected to the shank (22, 32) without any screws. The insert (21, 31) is formed of a silicon carbide whisker reinforced alumina sintered body, and the shank (22, 32) is made of steel. Due to this structure, the insert (21, 31) has an excellent wear resistance and an adhesion resistance. The shank (22, 32) has a sufficient toughness against breakage. Such a drill bit does not require any resharpening for continuous use during bit life.

8 Claims, 4 Drawing Sheets

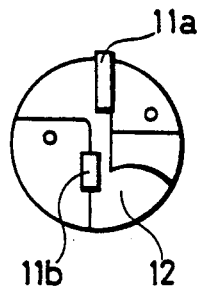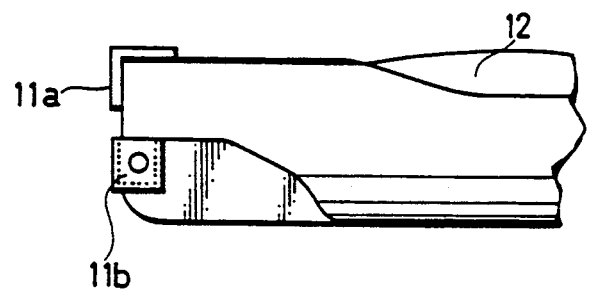
FIG.2A  FIG.2B
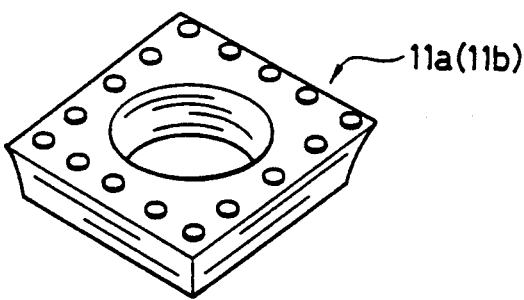
FIG.2C
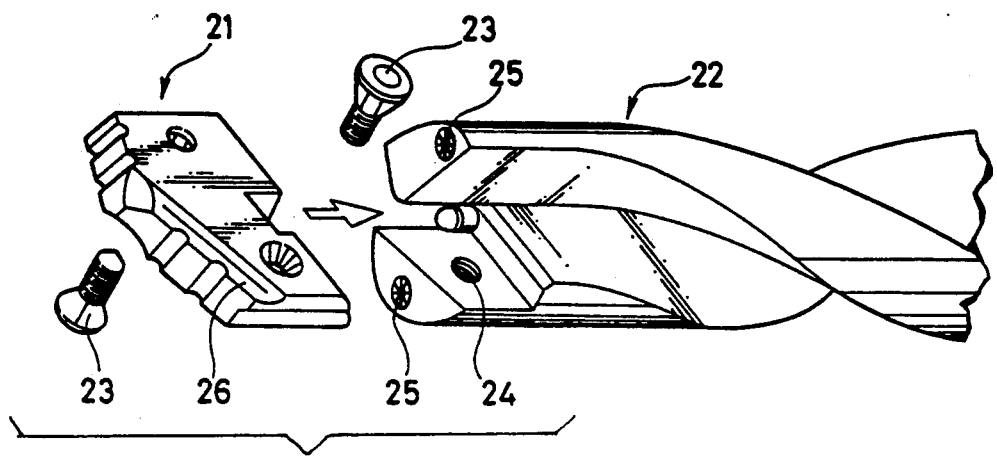
FIG.3

5,154,549

THROW-AWAY TIPPED DRILL BIT

This application is a continuation of U.S. patent application Ser. No. 07/649,615, filed on Feb. 1, 1991, now abandoned.

CROSS-REFERENCE TO RELATED APPLICATION

The present application is related to copending application U.S. Ser. No. 07/658,210, filed on Feb. 19, 1991, now abandoned.

FIELD OF THE INVENTION

The present invention relates to the structure of a drill bit which is mainly adapted to drilling steel, cast iron or super alloy, and more particularly, it relates to the structure of a high-quality throw-away tipped drill bit, which is excellent in wear resistance and toughness.

BACKGROUND INFORMATION

A drill bit is a rotating cutting tool for drilling steel products and the like. FIG. 1 shows an exemplary structure of a conventional twist drill bit. The twist drill bit is formed by a cutting portion 1 which is applied to drilling, and a shank 2 which is adapted to discharge chips and is held in a chuck etc. of a cutting machine such as a drilling machine.

In general, materials for drill bits are prepared from high-speed steel and cemented carbide. The high-speed steel, which is excellent in toughness but inferior in wear resistance, is improper for high-speed cutting. On the other hand, cemented carbide, which is excellent in wear resistance and tool accuracy characteristics but brittle, may cause breakage when the same is applied in a machine tool having a low rigidity, for example.

In order to improve such materials, there has been proposed a structure attained by coating a cutting portion of highspeed steel with hard TiN, a structure attained by brazing a cutting portion of cemented carbide, and the like.

In recent years, there has further been proposed a structure attained by brazing different cemented carbide materials (P30 and D30) for improving the wear resistance and toughness as disclosed in Japanese Utility Model Laying-Open No. 58-143115 (1983), or by metallurgically integrating/connecting such different materials as disclosed in Japanese Utility Model Publication No. 62-46489 (1987). A drill bit having a double structure with central and outer peripheral portions has been made of different cemented carbide materials in consideration of the differences between the characteristics required for such drill bit portions, as disclosed in Japanese Patent Laying-Open No. 62-218010 (1987). A method of attaining such a double structure by injection molding has been disclosed in Japanese Patent Laying-Open Nos. 63-38501 or 38502 (1988). There has also been proposed a structure attained by preparing a material for a drill bit from cermet Ti-base cemented carbide in order to improve the adhesion resistance, as disclosed in Japanese Patent Laying-Open No. 62-292307 (1987).

A cutting portion and a shank of a drill bit are exposed to different load conditions during drilling. Therefore, different material characteristics are required for the respective parts or portions of such a drill bit. For example, wear resistance and adhesion resistance are required for a tip of the cutting portion, while toughness for maintaining strength of the tool is required for the shank. As to the tip of the cutting portion, different characteristics are required for central and outer peripheral portions thereof, since these portions are driven at different cutting speeds.

When a drill bit with a coated cutting portion for meeting the complicated requirements for the material characteristics, is resharpened for general use, the coating layer is inevitably separated at least from a front flank side, and hence most of the coating effect is lost.

On the other hand, a drill bit which is formed by brazing cemented carbide to its cutting portion, cannot be used for deep hold drilling of a hard to cut material. If the shank is made of steel, a significant difference between the thermal expansion coefficients of the steel and of the cemented carbide forming the cutting portion, exists whereby splitting or cracking may easily be caused during brazing.

In recent years, a cemented carbide material for the shank of a drill bit, has been brought into a coarse grain or high binder phase state, in order to improve the toughness of the shank. However, the strength of the material is reduced by distortion of the elastic limit. Hence, the shank has a tendency to break during perforating, or due to vibration of a workpiece, an unstable rotation of a cutting machine, or the like.

While a drill bit formed by inseparably and integrally connecting the cutting portion and the shank, can be repeatedly used by resharpening the cutting portion after a prescribed operating time, the number of such resharpenings is limited, and production costs are increased. Further, sharpness and the tool life of such bits are non-uniform depending on conditions under which the resharpening is performed. In addition, it is necessary to successively and correctly ascertain the length of the resharpened drill bit if the bit is used in a numerically controlled and automated cutting machine tool. Thus, the length of the drill bit must be measured by a complicated operation every time the same has been resharpened.

SUMMARY OF THE INVENTION

It is an object of the present invention to provide a throwaway tipped drill bit comprising an insert having an excellent wear resistance, an adhesion resistance, and a shank having a sufficient toughness against breakage, which requires no resharpening for prolonged, uninterrupted use.

In order to attain the aforementioned object, the present throwaway tipped drill bit comprises an insert for cutting a workpiece, and a shank to be mounted in a prescribed position of a cutting machine, wherein the insert is disengageably and mechanically connected with the shank. The insert is formed of a silicon carbide whisker reinforced alumina sintered body, and the shank is made of steel.

Preferably, the silicon carbide whisker reinforced alumina sintered body forming the insert, is prepared from a sintered body of alumina containing 3.0 to 40 volume percent of silicon carbide whiskers, whereby the aspect ratio of the silicon carbide whiskers is within the range of 3 to 200, whereby this ratio is a length to width, e.g. diameter ratio.

Characteristics required for a drill bit are roughly classified into wear and adhesion resistance for an insert, and breakage resistance, which is provided by the toughness of a shank. According to the present invention, a material for the insert is prepared from a silicon carbide whisker reinforced alumina sintered body for the following reason: The silicon carbide whisker reinforced alumina sintered body is prepared by introducing silicon carbide (SiC) whiskers into an alumina (Al$_2$O$_3$) sintered body. Compared to other ceramic materials, such a sintered body has an extremely high heat resistance and an excellent wear resistance as a tool, thereby providing an improved toughness and an increased impact resistance. This material has a small coefficient of friction with respect to iron, and is superior in wear resistance to a sintered body of silicon nitride (Si$_3$N$_4$). Further, an insert made of such a silicon carbide whisker reinforced alumina sintered body is suitable for working of not only workpieces of steel and casting but also a normally uncuttable or hard to cut material such as a heat-resistant Ni alloy.

The content of the silicon carbide whiskers is preferably 3.0 to 40 volume percent since the effect of improving the toughness is reduced if the content is less than 3.0 volume percent, while strength is reduced if the content exceeds 40 volume percent.

The shank, which is made of steel, is excellent in toughness and breakage resistance. Further, the material costs have been reduced.

In the drill bit according to the present invention, the insert and the shank are mechanically disengageable from each other, whereby it is possible to easily disengage and throw away the insert, when it has been worn-out.

The present insert has an excellent wear resistance, adhesion resistance, and thermal cracking or chipping resistance. The shank has an excellent toughness. The manufacturing costs have been reduced compared to conventional bits. Thus, it is possible to provide a throw-away tipped drill bit having a high reliability, a long life and a high quality. Chipping of the insert and an abrupt breakage of the shank are avoided at a low cost. The insert exchange is easy and resharpening is not required for a continuous use during the life of the insert, whereby the drill bit length remains constant and sharpeness is maintained during a prolonged bit life. Repeated length measurements are avoided.

The blank for the insert can be formed by injection molding, whereby it is possible to easily form a chip breaker or the like, to further reduce the working cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2A is a front elevational view showing a two-flute screwed throw-away tipped drill bit of the present invention;

FIG. 2B is a right side elevational view of the drill bit shown in FIG. 2A;

FIG. 2C is a perspective view on an enlarged scale showing an insert for use in FIGS. 2A and 2B;

FIG. 3 is an exploded perspective view showing a throw-away tipped drill bit of the invention with a two-flute screwed system;

DESCRIPTION OF THE PREFERRED EMBODIMENTS

Figure 1:
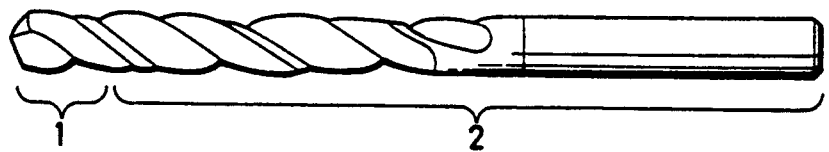
FIG. 1 is a structural diagram showing a conventional twist drill bit.

Examples of the present invention are now described.

An insert and a shank of the throw-away tipped drill bit according to the invention are connected with each other without screws as shown in FIGS. 4, 5A, 5B, 6A, 6B and 7. FIGS. 2A to 2C show a two-flute throw-away tipped drill bit wherein, inserts 11a and 11b are fixed by screwing to outer and inner peripheral portions of a forward end of a shank 12 respectively. FIG. 3 shows a typical example of a throw-away tipped drill bit, of a two-flute system, wherein an insert 21 is fitted in a shank 22 as shown by an arrow. The insert 21 is fixed by a screw 23 in a screw hole 24. A coolant supply hole 25 directly supplies a coolant to the tip of the insert 21. Further, a chip breaker 26 is provided on the cutting edge of the insert 21 for separating chips.

Figure 4:
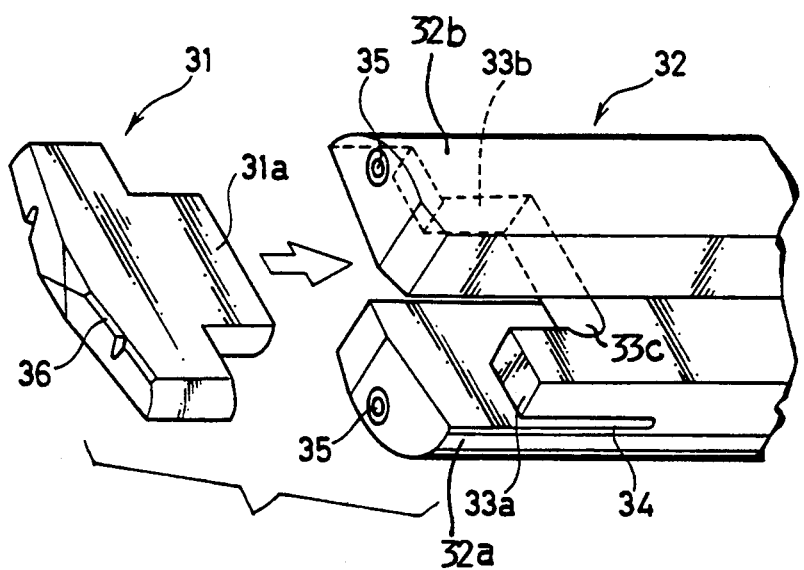
FIG. 4 shows, on an enlarged scale, an explosed perspective view showing a connection part and insert of a self-grip type drill bit of the invention.
Figure 5A:
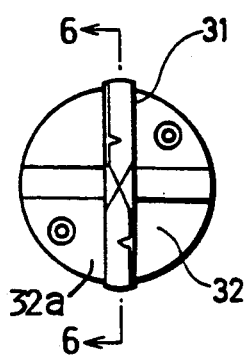
FIG. 5A is a front elevational view of the assembled drill bit shown disassembled in FIG. 4.
Figure 5B:
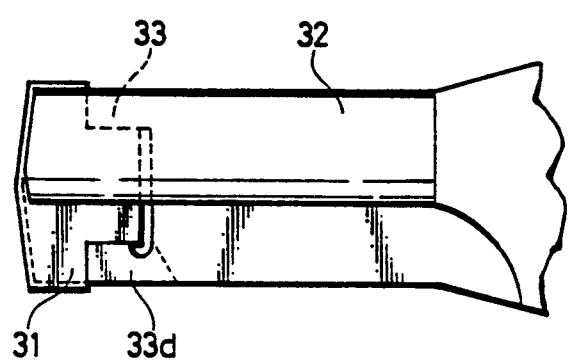
FIG. 5B is a right side elevational view of the assembled bit.

In a drill bit shown in FIGS. 4, 5A and 5B, an insert 31 is fitted in a shank 32 as indicated by an arrow shown in FIG. 4, so that the insert 31 and the shank 32 are connected with each other without any screw or the like, in a so-called self-grip connection shown in FIGS. 5A and 5B. In this self-grip connection side walls of a held portion 31a of the insert 31 are brought into contact with inner end surfaces of holding portions 33a and 33b of the shank 32 with a frictional force fit, whereby the insert 31 is fixed to the shank 32. At least one of the holding portions 33a and 33b is able to elastically yield radially outwardly relative to a central longitudinal axis of the shank 32 by reason of a slit 34 extending axially between the holding portion 33a and a rigid axially extending shank section 32a and due to a cut-back groove 33c. A corresponding slit not shown may be provided between the holding portion 33b and a rigid axially extending shank section 32b.

Figure 6A:
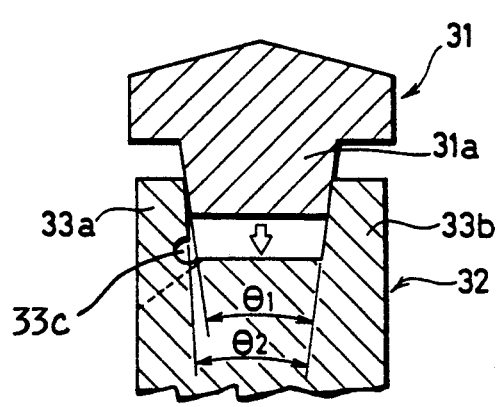
FIG. 6A is a sectional view taken along the line 6—6 in FIG. 5A, for illustrating an initial press fitting of an insert into a shank.
Figure 6B:
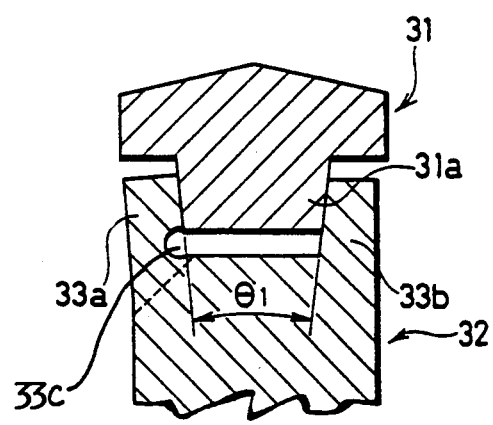
FIG. 6B is a sectional view similar to that of FIG. 6A but illustrating the completion of the press fitting.

With reference to FIGS. 6A and 6B, the state of such connection of the insert 31 with the shank 32 caused by engagement therebetween is explained as follows: Before the insert 31 is engaged with the shank 32, an angle $\theta_1$ formed by the left and right side walls of the held portion 31a is slightly greater than an angle $\theta_2$ formed by the opposite inner end surfaces of the holding portions 33a and 33b. When the insert 31 is press-fitted in the shank 32, the angle $\theta_2$ is gradually expanded by wedge action due to tapering of the left and right side walls of the held portion 31a and due to the slit 34 provided on the holding portion 33a as shown in FIG. 4. When $\theta_1 > \theta_2$, the held portion 31a is in contact with the holding portion 33b only at an upper end of the inner end surface of the holding portion 33a. When $\theta_2$ reaches $\theta_1$, the contact areas between both side walls of the held portion 31a and the inner end surface of the holding portion 33a, are maximized as shown in FIG. 6B. The press fitting operation is stopped in this state, and the holding portion 33a is elastically deformed to cause a pressing force in the contact surfaces of the holding portions and the held portion 31a, so that the insert 31 is connected with or fixed to the shank 32 by frictional force between the contact surfaces.

At least one coolant supply hole 35 shown in FIG. 4 directly supplies a coolant to the cutting edge of the insert 31. Further, a chip breaker 36 is provided on the cutting edge of the insert 31, in order to part chips also as shown in FIG. 3 at 25.

Figure 7:
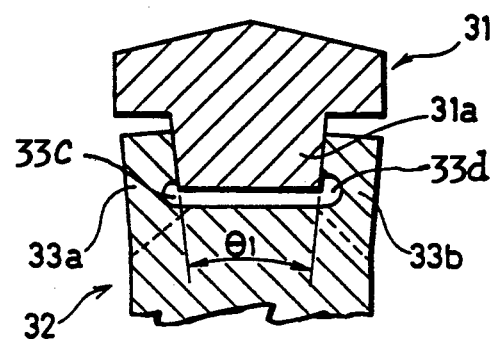
FIG. 7 is a sectional view illustrating another example embodiment of an insert connection part provided with slits on both sides of holding portions of the connection part.

FIG. 7 shows another example of a shank 32, which is provided with two slits 34, as shown in FIG. 4, not only in a holding portion 33a but also in another holding portion 33b. In this case, an insert 31 is press-fitted in the shank 32 so that both holding portions 33a and 33b are simultaneously expanded, thereby holding a held portion 31a by an elastic force. FIG. 7 also shows a second cut-back groove 33d mirror-symmetrical relative to the groove 33c and relative to a central longitudinal axis of the shank 32, whereby a symmetrical elastic expansion of the holding portions 33a, 33b is assured.

The just described throw-away tipped drill bit according to a first Example of the present invention, is formed by making the insert 31 of a silicon carbide whisker reinforced alumina sintered body which is disengageably mechanically connected with a shank 32 made of steel as shown in FIG. 4.

Table 1 shows composition values of various powder materials for silicon carbide whisker reinforced alumina sintered bodies forming inserts of the invention and of comparative samples. Table 1 also shows steel materials for shanks of the invention and for comparative samples. The present shanks and inserts and the comparative shanks and inserts shown in Table 1, are connected with each other respectively, in the manner shown in FIG. 4. Samples A to D are prepared according to the invention, although the sample D has a content (volume percent) of SiC whiskers in excess of a preferably range. In the comparative sample E, the material for the insert is out of the scope of the present invention since sample E does not contain SiC whiskers. In the comparative sample F, the material for the shank is made of a K30-grade cemented carbide material, which is out of the scope of the present invention.

TABLE 1

| Sample | | Insert Starting Composition (vol. %) | Shank |
|---|---|---|---|
| Samples of the invention | A | SiC Whisker (20), TiC powder (5), $Al_2O_3$ powder (Rest) | SCM435 |
| | B | SiC Whisker (15), MgO (0.5), $Y_2O_3$ (3), $Al_2O_3$ Powder (Rest) | SKS2 |
| | C | SiC Whisker (30), $ZrO_2$ (5.0), $Al_2O_3$ powder (Rest) | SCM415 |
| | D | **SiC Whisker (50), TiN powder (5), $Al_2O_3$ powder (Rest) | SCM435 |
| Comparative Sample | E | *TiC (10), $Y_2O_3$ (3), $Al_2O_3$ powder (Rest) | SCM435 |
| | F | SiC Whisker (20), TiN powder (5), $Al_2O_3$ powder (Rest) | K30-Grade Cemented Carbide |

*out of claimed range
**out of preferable range

SCM435 ⎫ Chromium Molybdenum Steels According to Japanese
SCM415 ⎭ Industrial Standard (JIS G4105-1979)
SKS2  Alloy Tool Steels (JIS G4404-1983)

Performance evaluation tests for the aforementioned samples were made on drill bits having a diameter of 8 mm, under the following conditions:

Workpiece: Inconel 718
Cutting Speed: 100 m/min., dry type (water-soluble cutting oil)
Feed Rate: 0.12 mm/rev.
Depth of Cut: 25 mm.
Criterion: Tip conditions etc. were observed after working up to end of life.
Life: Generally regarded as ended when the outer peripheral flank was worn by at least 0.2 mm.

Table 2 shows the results of the aforementioned 15 performance evaluation tests. Excellent results were obtained for samples A to C according to the invention. The cutting by the sample D of the invention was stopped after cutting 620 holes, due to heavy damage of the insert, which was caused by the content of Si whiskers in the insert being out of the preferable range of 3.0 to 40 volume percent, as shown in Table 1 by marks **. For the purpose of reference, similar experiments were made as to four types of conventional drill bits as shown in the lower part of Table 2. It is understood from the results that the present samples A to C are superior also to the conventional drill bits.

It has been experimentally confirmed that the silicon carbide whisker reinforced alumina sintered body of the present inserts can effectively contain a carbonitride, a carbonized oxide or an oxide of titanium, instead of TiC or TiN.

TABLE 2

| | Sample | Number of Drilled Holes | Abrasion of Outer Peripheral Front Flank (mm) | Depth of Adhesive Wear of Inner Peripheral Face (mm) |
|---|---|---|---|---|
| Samples of the Invention | A | 1620 | 0.2 | 0.02 |
| | B | 1550 | 0.2 | 0.04 |
| | C | 1740 | 0.2 | 0.05 |
| | D | 620 | 0.2 | 0.13 |
| Comparative Example | E | 840 | test stopped due to insert chipping | |
| | F | 115 | test stopped due to shank breakage | |
| Reference Example | Tip: $Si_3N_4$ Sintered Body | 700 | 0.2 | 0.10 |
| | Tip: Coated Cemented Carbide | 240 | test stopped due to insert chipping | |
| | Tip: Coated High-Speed Steel | 150 | 0.2 | 0.15 |
| | Integrated Coated Cemented Carbide | 45 | test stopped due to shank breakage | |

A second example of the present invention will now be described.

The samples of throw-away tipped drill bits of the second example of the invention were formed by inserts and shanks of the same materials as those for sample A of the first Example, to compare the cutting characteristics of three types of connection systems. Sample G was a self-grip drill bit shown in FIG. 4. Sample H relates to a two-flute screwed drill bit shown in FIGS. 2A to 2C. Sample I relates to a two-flute screwed drill bit shown in FIG. 3. Sample J is a comparative sample of a brazed drill bit, having an insert of cemented carbide, which was out of the scope of the present invention. The cutting conditions were as follows:

Workpiece: S50C, $H_B$=220
Cutting Speed V: 50 m/min. and 150 m/min. (water-soluble cutting oil)
Feed Rate: 0.2 mm/rev.
Depth of Cut: 40 mm
Diameter of Worked Hole: 20 mm Table 3 shows the results of the evaluated characteristics.

Cutting characteristics, represented by stability, can be regarded excellent since horizontal load components and thrusts of a cutting balance acting on the drills by the cutting resistance are reduced and values of speed dependency are also reduced.

From the results obtained for the samples of the invention, it is understood that the self-grip system of the sample G attained the most excellent cutting characteristics among the connection systems for the present throw-away tipped drill bits.

tacting said throw-away insert for taking up torque moments, whereby said throw-away insert is held in a self-grip manner without any screw.

2. The drill bit in accordance with claim 1, wherein said silicon carbide whisker reinforced alumina sintered body contains 3.0 to 40 volume percent of silicon carbide whiskers having an aspect ratio within the range of 3 to 200 of whisker length to whisker width, the remainder being alumina.

3. The drill bit in accordance with claim 1, wherein said silicon carbide whisker reinforced alumina sintered body further contains a member selected from the group consisting of a carbide, a nitride, a carbonitride, a carbonized oxide, and an oxide of titanium.

4. The drill bit in accordance with claim 1, wherein said silicon whisker reinforced alumina sintered body contains $ZrO_2$.

5. The drill bit in accordance with claim 1, wherein said silicon carbide whisker reinforced alumina sintered body contains a member selected from the group consisting of MgO, NiO, and $Y_2O_3$.

6. The drill bit in accordance with claim 1, wherein said steel forming said shank (22, 32) is selected from the group consisting of alloy tool steels (SKS) and chromium molybdenum steels (CMS).

7. The drill bit in accordance with claim 1, wherein said holding portions are part of said insert (21, 31) and of said shank (22, 32) to be engaged with each other respectively, and whereby said means for enabling comprise at least one slit (34) in at least one of said insert (21,

TABLE 3

| | | Sample | Compared Characteristics | | | | | | Remarks |
|---|---|---|---|---|---|---|---|---|---|
| | | | Cutting Balance (Horizontal Component) (N) | | Thrust (N) | | Torque (J) | Hole Diameter Over Size (μm) | |
| | | | Cutting Speed V (m/min.) | | | | | | |
| | | | 50 | 150 | 50 | 150 | 50 | 150 | |
| Sample of the Invention | G | Self-Grip Type | 190 | 180 | 1800 | 1850 | 3300 | 20 | Throw-Away Type shown in FIG. 4 |
| | H | Two-Flute Screwed Type With Two Inserts | 1610 | 590 | 1980 | 2050 | 3800 | 200 | Throw-Away Type Shown in FIG. 2A to 2C |
| | I | Two-Flute Screwed Type With One Insert | 400 | Unmeasurable | 7200 | Unmeasurable | 4200 | 3 | Throw-Away Type Shown in FIG. 3. Insert Departed at V = 150 |
| Comparative Sample | J | Brazed Type with Cutting Edge of Cemented Carbide | 150 | Unmeasurable | 2700 | Unmeasurable | 6200 | 20 | Helical Flute, Cross Thinning, Resharpening Available 5 Times. Incapable of Parting Chips and Broken at V = 150 |

(Note) Materials for inserts and shanks of present samples G, H and I are identical to those of sample A in Table 1.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A drill bit having a longitudinal central rotational axis, comprising a shank made of steel, a throw-away insert forming a drill bit tip made of an alumina sintered body reinforced by silicon carbide whiskers, and mounting means for releasably securing said throw-away insert to a forward end of said steel shank, said mounting means comprising holding portions arranged symmetrically to said central rotational axis, means for enabling at least one of said holding portions to elastically yield radially relative to said central rotational axis for elastically holding said throw-away insert with a frictional force fit in an axial direction, said steel shank comprising two axially extending shank sections con- 31) and said shank, so that opposite surfaces of said slit (34) are relatively moved when the respective holding portion is elastically deformed upon engagement to cause an elastic gripping force, thereby fixing said insert (21) to said shank (22, 32) without any screws.

8. The drill bit in accordance with claim 1, wherein said holding portions comprise a held portion (31a) forming part of said insert (21, 31) and two holding portions (33a, 33b) forming part of said shank (22, 32) for engaging left and right side surfaces of said held portion (31a), wherein said left and right side surfaces of said held portion (31a) and opposite holding surfaces of said holding protions (33a, 33b) are tapered, and wherein said surfaces are tapered at such angles that said engaging surfaces are brought into surface contact with each other with a press-fit upon engagement of said insert (21, 31) and said shank (22, 32) for forming said frictional force fit.

* * * * *

UNITED STATES PATENT AND TRADEMARK OFFICE
CERTIFICATE OF CORRECTION

PATENT NO. : 5,154,549
DATED : October 13, 1992
INVENTOR(S) : Kazutaka Isobe et al.

It is certified that error appears in the above-identified patent and that said Letters Patent is hereby corrected as shown below:

claim 1, column 8, line 3, replace "screw" by --screws--;

claim 4, column 8, line 16, after "silicon" insert
--carbide--.

Signed and Sealed this

Fourteenth Day of September, 1993

Attest:

BRUCE LEHMAN

Attesting Officer

Commissioner of Patents and Trademarks